May 28, 1963 R. H. BURNS ETAL 3,091,269
FOOD HANDLING APPARATUS
Filed Nov. 16, 1960 4 Sheets-Sheet 1
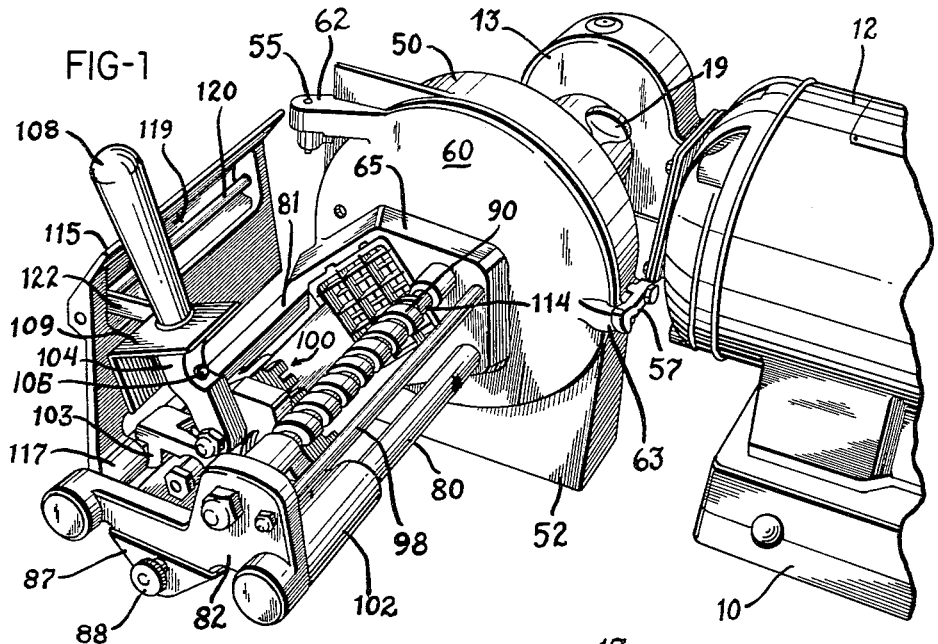
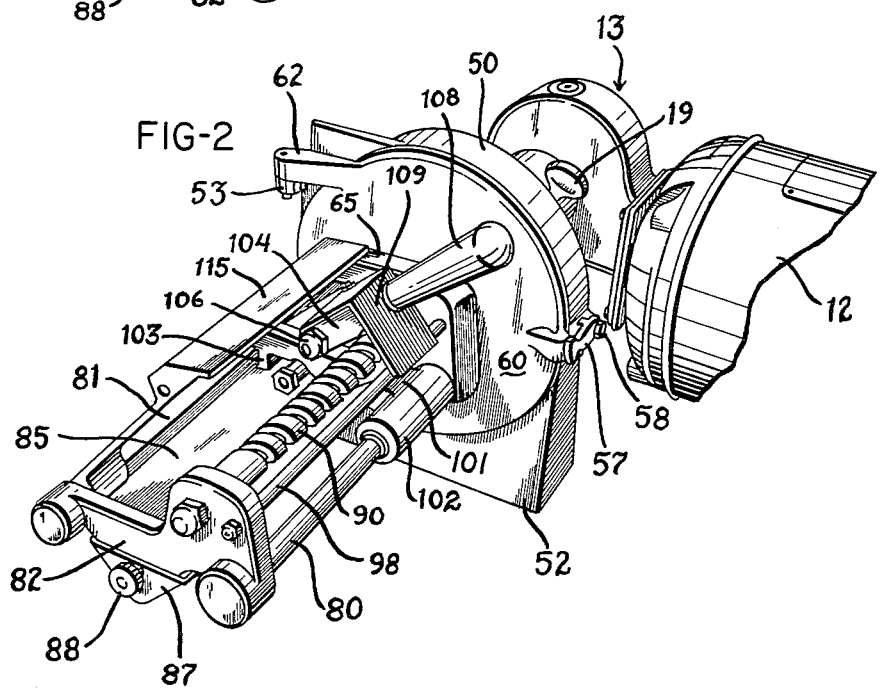
INVENTORS
RICHARD H. BURNS &
RICHARD S. HARTLEY
BY
Marechal, Biebel, French & Bugg
ATTORNEYS

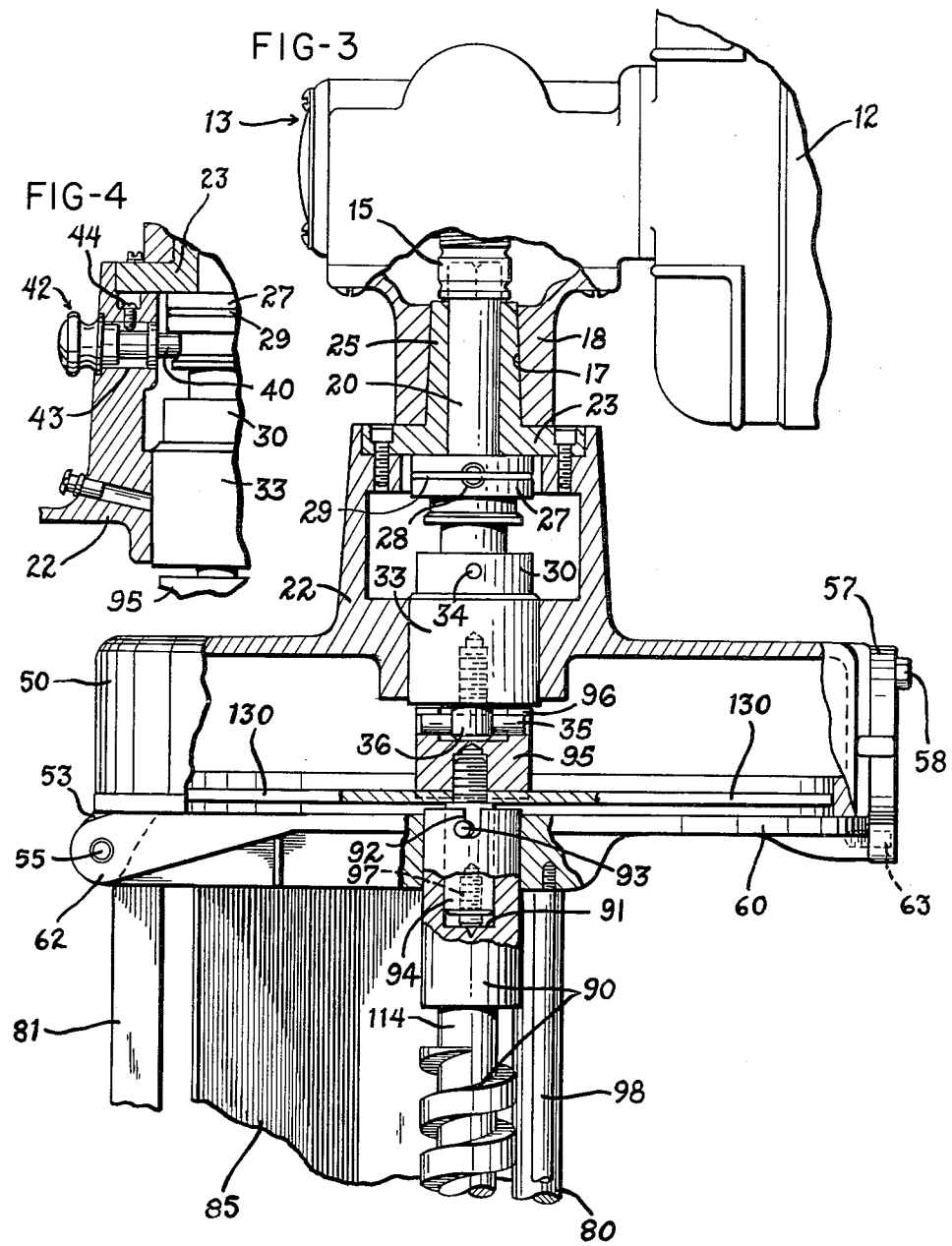

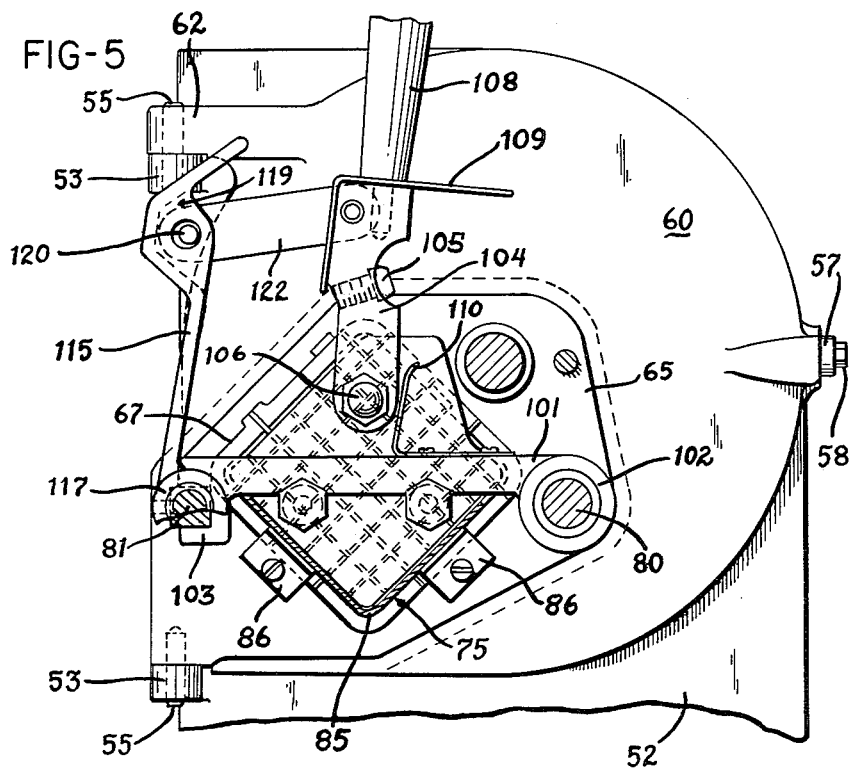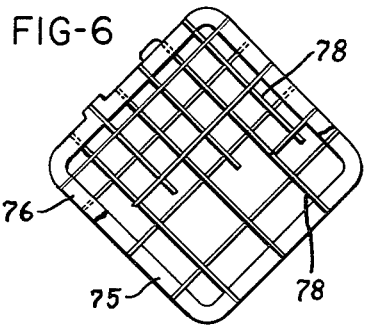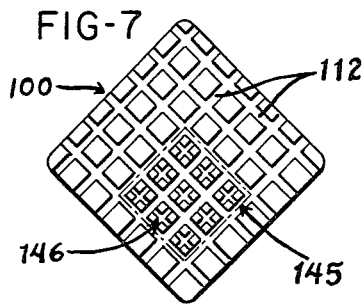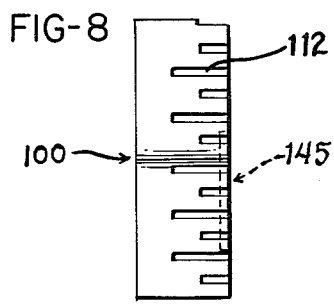

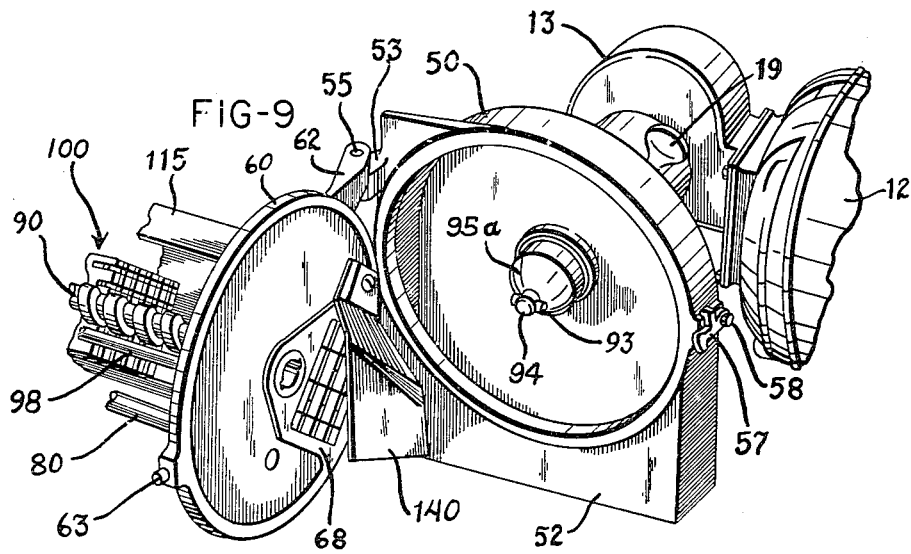
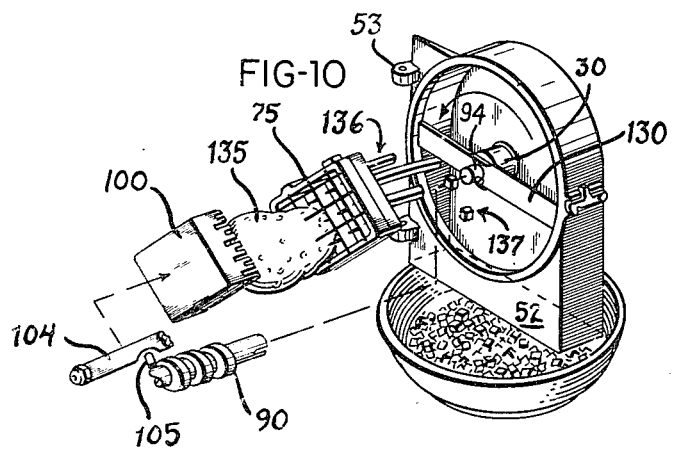
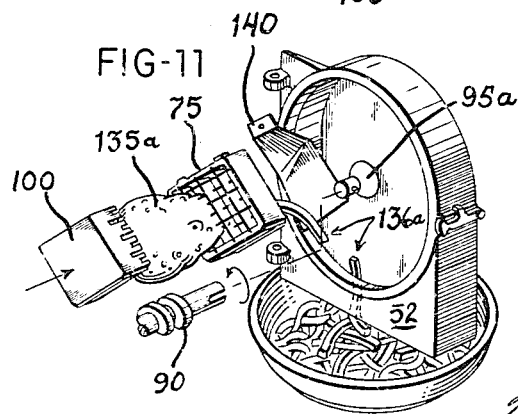

United States Patent Office 3,091,269
Patented May 28, 1963

3,091,269
FOOD HANDLING APPARATUS
Richard H. Burns and Richard S. Hartley, Troy, Ohio, assignors to The Hobart Manufacturing Company, Troy, Ohio, a corporation of Ohio
Filed Nov. 16, 1960, Ser. No. 69,755
9 Claims. (Cl. 146—78)

This application is a continuation-in-part of our application, Serial No. 845,731, filed October 12, 1959, now abandoned.

This invention relates to food handling apparatus, particularly to a power driven device for sizing various vegetables such as potatoes, carrots, beets, turnips, and the like, to dice the vegetables into cubes of essentially the same size, or to produce elongated strips of vegetables of essentially the same cross section, as in potatoes for French frying, or to cut the vegetables simultaneously into a number of slices of predetermined thickness.

The apparatus disclosed herein is particularly adapted for use as a novel attachment to existing food handling equipment, such for example as a motor driven food cutter of the type disclosed in Patent 2,072,681, issued to the assignee of the present application. Thus, the preferred embodiment described herein is constructed as an attachment for existing food handling equipment, including a suitable coupling for driving from the power source of such equipment, although it will be apparent that apparatus in accordance with the invention may be constructed as an independent unit with its own power source.

In vegetable cutting and sizing equipment of the type with which this invention is concerned, particularly in the dicing of vegetables or the like where the vegetable is forced through a grid-like cutter member to reduce it to a number of elongated strips of essentially the same cross section, and where these strips are cut off in relation to the feeding movement thereof through the cutter to provide cubes of essentially the same size, it is desirable to provide a direct mechanical correlation between the feeding motion and the operation of the last mentioned or cutoff knife, to obtain the desired uniformly sized cubes. Obviously, the best type of correlation is provided by a power operated feed for forcing the vegetable through the cutter member in direct relation to the movement past the cutter member of the cutoff knife which makes the ultimate dicing cut. On the other hand, since this apparatus is used for food handling it must be easily subjected to cleaning and must be of such construction as to avoid collection of dirt or the like. Furthermore, the vegetables are placed manually in the apparatus, it is desirable to incorporate suitable safety features which will prevent injury to an operator, and yet will be essentially simple and direct in operation.

The primary object of this invention is to provide a novel type of apparatus for sizing vegetables and the like, including a power feed drive for forcing the vegetables at a predetermined rate through the sizing apparatus.

Another object of the invention is to provide food sizing apparatus, particularly for cutting vegetables and the like into pieces of predetermined dimension, which is adaptable for attachment to existing food handling equipment, and which can obtain the necessary power input thereto by coupling with a power drive on such existing equipment.

Another object of the invention is to provide a power drive for food sizing apparatus, particularly for use in cutting up vegetables and the like into pieces of predetermined dimension, including a lead screw having a power drive connection for rotation thereof in a feeding direction, and a pusher member having a lug manually engageable with the lead screw to effect a feeding movement of the pusher member.

A further object of the invention is to provide a novel drive for a rotary knife in food sizing apparatus, including an automatic disconnecting feature which interrupts the drive when the casing of the apparatus is opened.

An additional object of the invention is to provide novel vegetable sizing apparatus as above described, including provisions for replacement of the sizing cutters and knives, and also the power feed lead screw, with similar parts of relatively different dimensions capable of producing different sized pieces of vegetables fed through the apparatus.

Another object of the invention is to provide, in conjunction with the aforementioned power feed apparatus, a safety cover which automatically moves into operative position when a handle is moved in the direction to engage the pusher member lug with the power feed lead screw.

Another object of this invention is to provide a novel pusher block for apparatus of this type, wherein portions of the pusher block surface are recessed to enable the member to grip each vegetable as it forces the vegetable through the cutter member of the sizing apparatus.

Other objects and advantages of the invention will be apparent from the following description, the accompanying drawings and the appended claims.

In the drawings—

FIG. 1 is a perspective view of apparatus in accordance with the invention, shown in the open position preparatory to receiving a vegetable for cutting thereof into pieces of predetermined size, and showing a portion of food handling equipment upon which the apparatus is adapted to be mounted;

FIG. 2 is a perspective view similar to FIG. 1 showing the pusher member in operative position, advanced to the cutter member of the sizing apparatus;

FIG. 3 is a view on an enlarged scale, partially in section and partially in elevation, showing the manner in which the apparatus is mounted upon and coupled to the food handling equipment and its power drive;

FIG. 4 is a detail section of the mechanism for locking the drive shaft in position;

FIG. 5 is an end view, with some parts broken away and shown in section, of the feeder end of the apparatus, and with the manual pressure responsive driving connection and the safety cover in a raised position similar to that shown in FIG. 1;

FIG. 6 is a detail view of the stationary cutter members, showing the rear member in elevation and the front member partially broken away;

FIG. 7 is a detail view of the front face of the pushing block on the pusher member;

FIG. 8 is an elevational view looking toward the one edge of the block as shown in FIG. 7;

FIG. 9 is a perspective view of the apparatus with the feeder structure and the stationary sizing cutter moved to an open or inoperative position, illustrating the mounting of a deflector which is utilized when cutting vegetables into elongated strips, as in cutting pieces of potato for French frying;

FIG. 10 is a diagrammatic perspective view illustrating the operative relationship of the parts during a dicing operation; and FIG. 11 is a view similar to FIG. 10 showing the operation of the apparatus in making French fry cuts and the like.

Referring to the drawings, and particularly to FIGS. 1-3, a preferred construction in accordance with the invention is adapted for mounting on existing food handling equipment, for example of the type disclosed in said United States Patent 2,072,681. This equipment includes a base 10 supporting a motor 12 which in turn carries a drive housing 13 upon one end thereof having suitable worm gearing (or similar) as shown in said patent, through which a rotary power drive is provided in the form of an output shaft 15 having a socket therein of polygonal cross-section. This shaft is aligned with an opening 17 in a mounting sleeve or extension 18.

A drive shaft 20 is mounted for rotation within a housing 22, having a bearing support at one end in the form of a separate mounting sleeve 23 suitably bolted to the housing and including a mounting hub 25 adapted to extend into the bore 17 for supporting the entire housing 22 from the extension sleeve 18. Shaft 20 is engaged with the socket in shaft 15, and also carries a rotating collar 27 secured thereto, as by set screw 28 and its retaining ring 29, and adapted for engagement with the face of the mounting sleeve 23. Shaft 20 also carries an enlarged sleeve member 30 at its forward end which is fixed to rotate therewith and which is rotatably supporting in a bushing 33 mounted in the housing 22.

The inward end of the sleeve member 30 is reduced in diameter and cross drilled to receive a suitable pin 34 which extends through shaft 20. The entire sub-assembly of driving shaft 20, attached sleeve 30, and collar 27, is adapted for removal from the housing by withdrawal through the forward end bushing 33. A replaceable drive pin 35 is carried in a bolt 36 threaded into the outer end of sleeve 30. The shaft 20 and associated parts are retained in position within the housing by a lug 40 (FIG. 4) extending from a retainer member 42 which is slidably mounted in a bore 43 extending radially of the housing 22, and retained for limited sliding movement by means of the retaining screw 44 which extends into an undercut portion of the retainer 42. When it is desired to replace a drive shaft and driving sleeve the member 42 is withdrawn radially outward to provide clearance between the collar 27 and the lug 40 permitting withdrawal of the seal and the attached shaft, etc.

The housing 22 includes an integral main portion in the form of a shallow drum-like part 50 of generally cylindrical formation in vertical section, including a downwardly open chute extension 52 at its lower edge from which the sized material will be discharged. The housing member 50 includes hinge lugs 53 (FIG. 5) which carry upwardly extending hinge pins 55, preferably press fit into the hinge lugs. At the opposite side of the housing member 50 there is a pivotally mounted latch member 57, carried on a mounting bolt 58.

With the exception of the particular drive shaft and driving sleeve structure as above described, the aforementioned parts are available to the purchaser of the existing food handling equipment together with suitable food shredding or slicing equipment mounted on the housing member 50, as in the form of a suitable pivotally carried door (not shown). The food sizing attachment provided by this invention includes the shaft 20 and its driving sleeve 30, together with a door or cover 60 having hinge ears or lugs 62 engageable with the hinge pins 55, together with a retaining lug 63 engageable with the latch member 57 to hold the door in its closed position. This door includes a raised section 65 extending over essentially one quadrant of the outer surface thereof, and beyond the center of the door partially into the adjacent quarters, as shown particularly in FIGS. 1 and 5.

In this raised portion 65 there is formed a through aperture 67 (FIG. 5) which is preferably of square cross-section, arranged as an essentially square diamond-shape with respect to the vertical and horizontal central lines of the door. This aperture includes a lip 68 at its inner end (FIG. 9) which provides an inner limit or abutment for a pair of stationary inner and outer cutter members 75 and 76 respectively, which are received in stacked relation within the aperture 67.

Each of the cutter members carries a plurality of stationary knives or blades 78 which may be mounted in any suitable fashion to cut a vegetable forced therethrough into pieces of desired configuration. In the illustrated embodiment the blades 78 are arranged in each cutter member in an essentially grid-like or waffle pattern, with the squares of each grid of twice the size of the desired pieces, and with the squares formed by the blades in the separate members offset, as shown particularly in FIG. 6, such that half of the desired cut is made during movement of the vegetable through the first set of blades, and the other half of the cut is made as the pieces progress through the second set of blades in the rear or inner cutter member 75.

Obviously, the illustrated stationary blade configuration is only one example of a suitable arrangement of blades, and the blades may be aligned all in one direction to produce slices, or at angles other than 90° with respect to each other to produce pieces of other than rectangular cross-section. A number of different such arrangements are known in the prior art, for example as disclosed in the patent to Johnston, 1,709,912.

The means for forcing the vegetables or other material to be sized through the stationary cutters includes a pair of main guide rods 80 and 81 which are mounted in suitable cantilever fashion within the enlarged or thickened portion 65 of the door and which extend forwardly therefrom in parallel relation, carrying a front cross member 82 at their outer end. Rod 80 is of essentially uniform circular cross-section throughout its length, while rod 81 is of rectangular cross-section (FIGS. 1 and 5) over a major portion of its length. Between the portion 65 and the outer member 82 there is mounted an open top guideway in the form of an upwardly opening V-shaped trough member 85 having its forward or inner end seated against the opening in the outer cutter member 76, as shown particularly in FIG. 5, and including depending lugs 86 which are suitably aligned against the portion 65 and in turn hold the frames 75 in place. The member 85 also has a lip 87 at its outer end carrying an attachment screw 88 which is engaged with the cross member 82.

A driving member in the form of a lead screw 90 is journaled at its rearward end in the raised portion 65 of the door, and at its forward end within the forward cross member 82. This lead screw is provided with a socket part at its inner or rearward end including a bore 91, and undercut or "bayonet" slots 92 adapted to receive a coupling pin 93 carried on a fitting 94. This fitting is threaded into a driven hub 95 having a slot 96 which receives pin 35 when the door 60 is closed, completing the drive to lead screw 90 only so long as the door is closed. Fitting 94 also includes a set screw 97 adjustable to assure a tight fit of pin 93 in the bayonet slots 92.

Preferably, a tie rod 98 extends parallel to and adjacent the lead screw to assist in taking up thrust in the members thus maintaining proper alignment of the upper portion of the cross member 82 and also to protect the lead screw 90 to some extent from accidental blows or the like which might damage its surface.

The vegetables to be sized are placed upon the guideway 85, and are forceably fed into the stationary cutter members by means of a pusher member indicated by the general reference numeral 100. This pusher member or block is mounted upon a carriage 101 having slide bearings 102 and 103 at its opposite ends which are slidably received over the guide rods 80 and 81, respectively, for movement in translation toward and away from the door 60.

The mechanical feeding movement is provided by a manually operable drive connection between the carriage and the pusher member and the driving member or lead screw 90. This connection includes an arm 104 having a driving lug 105 (FIGS. 1 and 5), and which is pivotally mounted on the carriage 101 through a mounting bolt 106. A handle 108, for manual control of such pivotal movement, is mounted to extend outwardly of the arm 104, above and away from lead screw 90. The outer portion of the arm, which is engaged over the lead screw during feeding operations, preferably is covered by a protective cover member 109.

In operation of the driving connection, assuming that the carriage is retracted to its outer positions as shown in FIG. 1, and that motor 12 is running to rotate lead screw 90 in the appropriate direction, the operator grasps handle 108 and pivots it until the lug 105 engages with lead screw 90. Preferably, this pivotal movement is resisted by a light leaf spring 110 urging these members apart, although such spring is not essential to the desired operation, and serves mainly to hold the arm away from the lead screw when the device is not operating. In response to a maintained pressure exerted upon the arm 104, the lug 105 will be held in engagement with the lead screw and the pusher member 95 will move forward, forcing the vegetable on guideway 85 through the stationary cutters at a rate which is determined by the speed of rotation of shaft 20 and the lead angle of the lead screw 90.

At the forward end of the feeding stroke the pusher member will be within the grid-like blade structure of the cutter members, by reason of the complementary grid-like slotted pattern 112 formed in the surface thereof, as shown particularly in FIGS. 7 and 8. Thus the pusher member will serve to force all pieces entirely through the stationary cutters. At the same time, the lug 105 will reach the forward end of the lead screw and pass into the undercut section 114 thereof (FIG. 3), terminating the feeding pressure.

For the protection of the operator, a cover 115 is pivotally mounted on the outer guide rod 81, through a cylindrical extension 117 thereof received about a cylindrical outer end of that guide rod. A recess 119 is formed in the surface of cover 115, and a stationary guide shaft 120 is mounted therein, engaging a connecting arm 122 which is in turn pivotally mounted to the arm 104. Therefore, when the operator exerts engaging pressure upon handle 108 cover 115 will automatically swing downwardly over the guideway 85, and will remain in this position with the arm 122 sliding along shaft 120 during the feeding movement.

As explained above, the present apparatus is adapted for sizing vegetables and the like in a number of different ways, for example, dicing, slicing, or producing elongated strips of essentially the same cross-section. In the dicing operation, as the vegetable is forced through the stationary cutters it is separated into a plurality of elongated strips of essentially the same cross-section, and to produce cubes of approximately the same size it is necessary to cut the elongated strips at appropriate intervals during the discharge thereof from the stationary cutters. By coordinating this cutoff operation with the force feed of the vegetable through the cutters, a diced product is attained having essentially uniformly sized pieces.

For this purpose, referring to FIGS. 3 and 10, a rotary cutoff knife 130 is secured to the driven hub 95 by fitting 94, and rotates therewith past the inner or discharge face of the inner cutter member 75. The rotary speed of the cutoff knife 130 is directly related to the rotation of lead screw 90, since both are driven from the same shaft 20. Therefore, proper selection of lead screw angle with respect to the size of the strips formed by a particular set of cutter blades will result in passage of the knife blade through the strips in such timed relation that the length of the pieces cut off will approximately equal the cross-sectional dimensions of the strips to produce essentially uniform cubes.

In some instances, where smaller strips are provided by more closely spaced cutter blades 78, it may be desirable to provide a cutoff knife having more than two blades, for example a four bladed knife may be used. It will be understood, however, that the relationship between the number of blades on the cutoff knife and the lead angle on the lead screw 90 will determine the ultimate size of the diced product. In a preferred embodiment of the invention, separate sets of cutters 75 and 76 having blades 78 spaced at relatively different distances are provided, together with separate corresponding lead screws 90 and cutoff blades 130 matched to the spacing of the cutter blades such that substitution of these parts having relatively different dimensions may be readily effected to produce a different size diced product, or, as will presently be described, a different size of elongated strips.

The schematic diagram of FIG. 10 illustrates the relative movement of the basic parts of the apparatus to produce a diced product. For purposes of explanation it will be assumed that a potato 135 is placed upon the guideway, and assuming that the motor is energized and drive shaft 30 is rotating, to drive the knife 130 and lead screw 90 in correlated relation, then when the operator pivots handle 108 to engage lug 105 with the lead screw, and to maintain such engagement, the potato will be forced by the pusher member 100 through the stationary cutters 75 and 76 producing the elongated strips of potato 136 which are of essentially the same cross-section, and as these strips discharge from the stationary cutter members they are cut off to predetermined length by the rotating knife with the cube or diced product 137 falling through the discharge chute 52 into a bowl or other collector.

If the cutoff knife 130 is omitted, then the elongated strips will themselves be discharged through chute 52 as the pusher member 100 forces the potato entirely through the stationary cutters. Thus, referring to FIGS. 9 and 11, the apparatus may be used to produce strips of potato or the like, as for French frying, by utilizing a modified hub 95a, which hub may have a beveled forward end and does not carry a cutoff knife. The hub 95a is shown in its driving position in FIGS. 9 and 11, for purposes of illustration, although in use the hub would normally be carried with door 60 when it is opened. A deflector plate 140 is secured to the inner or back face of door 60, extending in spaced relation to the inner face of the rear cutter member 75, and also extending at an angle with respect to the door such that the lower end thereof is spaced farther than the door.

The operation of this apparatus is shown diagrammatically in FIG. 11, where the elongated strips 136a formed from a potato 135a are deflected gradually toward the discharge chute 52. This prevents the leading end of the strips from abrupt engagement with the back wall of the housing 22, which might tend to break long strips and produce an irregular surface at such a breaking point. Of course, particularly with potato strips for frying, it is undesirable to have other than essentially smooth surfaces over the exterior of the strips, and therefore such breaks would result in an unsatisfactory product.

Obviously, it is also possible to produce wider slices of essentially uniform thickness with this apparatus by utilizing cutter members having a plurality of blades extending parallel and in one direction only, for example as disclosed in the above mentioned Patent No. 1,709,912.

Referring to FIGS. 7 and 8, the pusher member 100 includes in its slotted face construction a recessed portion 145, which is conveniently illustrated by a dot-dash boundary line, and the depth of which is indicated on FIG. 8. This recessed area occupies approximately one-fourth the surface of the active face of the pusher member, preferably located symmetrical with the vertical axis and somewhat below the horizontal axis, as shown in the drawings. Experience has shown that this construction enables the pusher member to grip the potato or other vegetable or piece of vegetable being sized, preventing slippage thereof in the guideway 85, but without cutting or marring the surface of the vegetable engaged by the pusher member.

The depth of the recessed portion 145 is of such relatively shallow proportions that the parts thereof extending between blades of the cutter member project essentially to the innermost edge of the rear cutter member 75, at least sufficiently to expel any pieces of material which might tend to stick between blades of that cutter member. As shown particularly in FIG. 7, it may also be desirable to provide additional cross slots between the slots 112 within the boundaries of the area 145, and these additional slots are indicated by the general reference numeral 146. Such a configuration provides additional breaks in the surface of the pusher member within the recessed area 145, and enhances the gripping ability of the pusher member to prevent movement of the material up the sides of the guideway 85 as the material is forced through the cutter members.

The present invention, therefore, provides power driven apparatus which is particularly useful in performing various sizing operations on vegetables or the like. The apparatus may be constructed, as described, as an attachment for existing food handling equipment, and thus the purchaser owning such equipment may add to the versatility of his existing equipment. Of course, the food sizing apparatus may also be constructed as a separate unit if desired. The apparatus is adapted to perform different sizing operations, i.e., dicing, cutting into elongated strips as for French frying potatoes, or slicing, and it is also possible to provide for several different sizes of diced product. These changes in types of sizing may be made readily, merely by substituting appropriate stationary cutter members, and cutoff blades with appropriate number of blade arms, or by omission of the cutoff blades in some instances. When changing the size of diced product cutter members having additional closer spaced blades may be inserted, together with either a lead screw having a different lead angle, or a cutoff knife having additional blade arms, or both.

The novel power feed drive employs manual actuation for the complete feeding operation. Thus, the manual force required is only that necessary to engage lug 105 with lead screw 90. Whenever the engaging pressure is applied to the power feed mechanism the safety cover automatically moves to its protective position, preventing entry of the operator's hands, or foreign objects into the guideway upon which the vegetables are supported during feeding to the stationary cutter members. Furthermore, whenever door 60 is opened the power drive to the entire unit, including blade 130 when it is used, is terminated automatically, eliminating danger to the operator's hands.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. Apparatus for cutting vegetables and the like into pieces of predetermined dimension, comprising a guideway adapted to support vegetables to be cut, a multi-bladed cutter member, means supporting said cutter member in stationary position at one end of said guideway extending generally transversely thereof, means defining a discharge chute for sized pieces on the opposite side of said cutter member from said guideway, a pusher member supported for movement toward and away from said cutter member along said guideway to force vegetables therein through said cutter member, a driving member extending along said guideway and having a driving connection adapted to move said driving member in a direction forcing said pusher member toward said cutter member, means connected to rotate said driving member continuously in normal operation of the apparatus, and a manually controlled driving connection between said pusher member and said driving member operative to transmit driving force to said pusher member only in response to manual engaging pressure exerted thereon.

2. Apparatus for cutting vegetables and the like into pieces of predetermined dimension, comprising an elongated open top guideway adapted to support vegetables to be cut, a multi-bladed cutter member, means supporting said cutter member in stationary position at one end of said guideway extending generally transversely thereof, means defining a discharge chute for sized pieces on the opposite side of said cutter member from said guideway, a pusher member supported for movement toward and away from said cutter member along said guideway to force vegetables therein through said cutter member, a lead screw extending along said guideway and having a driving connection adapted to rotate said lead screw in a direction tending to move said pusher member toward said cutter member, drive means for said lead screw connected to rotate said lead screw continuously during normal operation of the apparatus, a manually controlled driving connection between said pusher member and said lead screw including a lug on said pusher member selectively engageable with said lead screw, and engaging means on said pusher member responsive to manual pressure to maintain said lug engaged with said lead screw.

3. Apparatus for cutting vegetables and the like into pieces of predetermined dimension, comprising an elongated open top guideway adapted to support vegetables to be cut, a multi-bladed cutter member, means supporting said cutter member in stationary position at one end of said guideway extending generally transversely thereof, means defining a discharge chute for sized pieces on the opposite side of said cutter member from said guideway, a pusher member supported for movement toward and away from said cutter member along said guideway to force vegetables therein through said cutter member, a lead screw extending along said guideway and having a driving connecttion adapted to rotate said lead screw continuously in a direction tending to move said pusher member toward said cutter member, a manual pressure responsive driving connection between said pusher member and said lead screw including a lug on said pusher member selectively engageable with said lead screw, means normally holding said lug out of engagement with said lead screw in a non-operative condition, engaging means on said pusher member responsive to manual pressure to maintain said lug engaged with said lead screw, and a safety cover pivotally mounted on said pusher member and operatively connected with said engaging means for movement into overlying relation to said guideway responsive to manual actuation of said engaging means to produce feeding movement of said pusher member.

4. Apparatus for use with a cutting machine having a generally circular housing with a discharge opening at the bottom thereof and having a rotary power drive therein, said apparatus comprising a door having means for mounting thereof across an end of said housing opposite said drive and movable between open and closed positions, means defining a through aperture in said door for passage of material into said housing with said door closed, a plural-bladed cutter extending transversely of said aperture for cutting material passed through said aperture into a plurality of pieces, a guideway mounted on said door and extending away from said door generally in alignment with the lower edge of said aperture for directing material thereon toward said cutter, a pusher member mounted for linear movement along said guideway and for pivotal movement toward and away from said guideway at any location along the path of said linear movement, a driving member mounted on said door and extending along said guideway for engagement with said pusher member, a coupler on said driving member operative to engage with the power drive on the cutting machine in the closed position of said door, and a manual engaging pressure responsive driving connection between said pusher member and said driving member operative to move said pressure member forceably toward said cutters.

5. Apparatus as defined in claim 4 including a rotary cutoff knife mounted on said coupler and operative to move past said discharge opening in said housing to cut the pieces discharged from said plural-bladed cutter into predetermined lengths.

6. Apparatus as defined in claim 4 including a recessed portion formed in said pusher member on the surface thereof engageable with vegetables supported on said guideway to resist slipping of the vegetables out of the guideway during force feeding of the vegetables through said plural-bladed cutter.

7. Apparatus as defined in claim 4 wherein said plural-bladed cutter includes a pair of cutter members each having blades extending in one direction, said cutter members being mounted transversely to each other to form a grid-like arrangement in which the vegetables are cut first in one direction and then in a transverse direction as the vegetables are forced through said cutter members.

8. Apparatus for cutting vegetables and the like into pieces of predetermined dimension, comprising a housing having a discharge opening at the bottom thereof and having an aperture through one side thereof, a rotary cutoff knife adapted to move past said aperture within said housing, drive means connected to rotate said cutoff knife past said aperture, a stationary cutter member including a plurality of blades supported in predetermined spaced relation, means removably mounting said cutter member in said aperture providing for discharge of material passing said blades into said housing past said cutoff knife, a guideway for material to be cut extending outwardly from the exterior of said housing and aligned with the lower portion of said aperture for guiding material thereon into said stationary cutter member, a pusher member supported for movement toward and away from said cutter member along said guideway to force material thereon through said cutter member and past said blades, a driving member removably mounted in position extending along said guideway, a manual engaging pressure responsive driving connection between said pusher member and said driving member operative to move said pusher member under power toward said cutter member, and means connecting said driving member to said drive means coordinating the cyclic movement of said cutoff knife with feed stroke movement of said pusher member for cutting into predetermined lengths the cut pieces of vegetable passing from said stationary cutter member.

9. Apparatus for cutting vegetables and the like into pieces of predetermined dimension, comprising a housing having a discharge opening at the bottom thereof and having an aperture through one side thereof, a cutoff knife adapted to move past said aperture within said housing, drive means connected to rotate said cutoff knife past said aperture, a cutter member including a framework defining an opening and a plurality of blades extending across said opening in predetermined spaced relation, means mounting said cutter member in fixed position in said aperture providing for discharge of material passing said blades into said housing past said cutoff knife, a guideway for material to be cut extending outwardly from the exterior of said housing and aligned with the lower portion of said aperture for guiding material thereon into said cutter member, a pusher member supported for movement toward and away from said cutter member along said guideway to force material thereon through said cutter member and past said blades, a driving member extending along said guideway for providing a powered feed stroke of said pusher member toward said cutter member, a manual engaging pressure responsive driving connection between said pusher member and said driving member operative to move said pusher member under power toward said cutter member only in response to engaging pressure exerted thereon, means connecting said driving member to said drive means coordinating the cyclic movement of said cutoff knife with feed stroke movement of said pusher member, and means adapting said driving member for movement independent of said drive connection providing for a manual return movement of said pusher member subsequent to each feed stroke thereof.

References Cited in the file of this patent

UNITED STATES PATENTS

| | | |
|---|---|---|
| 1,234,724 | Broomfield | July 31, 1917 |
| 1,709,912 | Johnston | Apr. 23, 1929 |
| 2,131,092 | Bloomfield | Sept. 27, 1938 |
| 2,341,582 | Turner | Feb. 15, 1944 |

FOREIGN PATENTS

| | | |
|---|---|---|
| 538,114 | Germany | Nov. 11, 1931 |
| 846,502 | France | June 12, 1939 |
| 50,539 | France | June 11, 1940 |
| 458,019 | Canada | July 12, 1949 |